(12) United States Patent
Nikiforou

(10) Patent No.: US 8,442,188 B2
(45) Date of Patent: May 14, 2013

(54) AUTOMATIC INCUBATION AND REVIVAL OF MESSAGES IN MESSAGE SYSTEMS

(76) Inventor: Filippos Nikiforou, Peggia (CY)

( * ) Notice: Subject to any disclaimer, the term of this patent is extended or adjusted under 35 U.S.C. 154(b) by 826 days.

(21) Appl. No.: 12/463,620

(22) Filed: May 11, 2009

(65) Prior Publication Data

US 2009/0220058 A1   Sep. 3, 2009

Related U.S. Application Data

(62) Division of application No. 11/348,797, filed on Feb. 6, 2006.

(60) Provisional application No. 60/749,890, filed on Dec. 12, 2005.

(51) Int. Cl.
  *H04M 11/00* (2006.01)
  *H04M 1/64* (2006.01)

(52) U.S. Cl.
  USPC ............................ 379/88.13; 379/69

(58) Field of Classification Search ............... 379/88.23, 379/88.01
  See application file for complete search history.

(56) References Cited

U.S. PATENT DOCUMENTS

| | | | | |
|---|---|---|---|---|
| 5,748,884 A * | 5/1998 | Royce et al. | ..................... | 714/57 |
| 6,108,688 A * | 8/2000 | Nielsen | ......................... | 709/206 |
| 6,278,454 B1 * | 8/2001 | Krishnan | ...................... | 715/846 |
| 6,828,989 B2 * | 12/2004 | Cortright | ...................... | 715/769 |
| 7,213,210 B2 * | 5/2007 | Reysa | ............................. | 715/752 |
| 8,286,089 B2 * | 10/2012 | Hardy et al. | .................. | 715/772 |
| 8,291,347 B2 * | 10/2012 | Bocking | ....................... | 715/859 |
| 2001/0034769 A1 * | 10/2001 | Rast | .............................. | 709/206 |
| 2002/0181670 A1 * | 12/2002 | Myers et al. | ............... | 379/88.13 |
| 2002/0198951 A1 * | 12/2002 | Thurlow et al. | ............... | 709/206 |
| 2003/0171971 A1 * | 9/2003 | Lovekin et al. | .................... | 705/9 |
| 2004/0210587 A1 * | 10/2004 | Reysa | ........................... | 707/100 |
| 2005/0210114 A1 * | 9/2005 | Washburn | ....................... | 709/206 |
| 2005/0262435 A1 * | 11/2005 | Ramanujan | ................... | 715/513 |
| 2006/0010379 A1 * | 1/2006 | Kashi | ............................ | 715/531 |

* cited by examiner

*Primary Examiner* — Joseph T Phan
(74) *Attorney, Agent, or Firm* — Donald R. Boys; Central Coast Patent Agency, Inc.

(57) ABSTRACT

A computerized message transaction system has an incubation function and a storage repository. In this system a transaction or a version of the transaction may be stored for a pre-specified period of time, and may be revived at the end of the specified time.

5 Claims, 5 Drawing Sheets

AUTOMATIC INCUBATION AND REVIVAL OF MESSAGES IN MESSAGE SYSTEMS

CROSS REFERENCE TO RELATED APPLICATIONS

The instant application is a divisional of co-pending U.S. application Ser. No. 11/348,797, filed on Feb. 6, 2006, which is a non-provisional of U.S. provisional patent application Ser. No. 60/749,890, filed on Dec. 12, 2005, and the entire disclosure of these applications are incorporated herein, at least by reference.

BACKGROUND OF THE INVENTION

1. Field of the Invention

The present invention is in the area of message systems, of which email clients and Instant Messaging (IM) systems are good examples, and pertains more particularly to systems and methods for storing away messages that have action or future event associations, and causing the same to reappear at an appropriate time for the associated action or event.

2. Discussion of the State of the Art

The present invention pertains to and has application to a variety of computer-functional messaging systems, of which email systems are a specific example. Email systems are used rather extensively in description below to illustrate principles, features and used of the invention, but the invention in many embodiments is not limited to email systems.

Electronic mail (email) systems are well known at the time of filing the present patent application, and are systems provided by software on network-connectable computers for sending emails from one computer to another. In most cases the network is the well-known public Internet network, but the uses of computerized messaging are not limited to the Internet. Such messaging is also useful on private networks, Intranets, and the like.

The software executable to provide email services is known in the art as an email client. There are several well-known email clients commercially available, of which Outlook Express™ and Gmail™ are examples. Such systems operate and send and receive messages according to a specific protocol, and are typically associated with a specific user. It is common for a display format to be used that includes "to" and "from" email addresses, an overt "cc" field, in some cases a covert "cc" field, a subject line, and when such messages are stored and then later accessed, enabled by the fact that a date and time of transaction is associated with an email, the date and time that the email is sent may be displayed.

In both personal and business activities computerized messaging has become a heavily-used tool. One big advantage, as compared to, for example, voice mail, is that the electronic messages are in a machine-readable format, so that search functions, parsing systems and the like may be used in conjunction with messages. Further, messages may be stored and listed in a number of different ways, such as by sender, by recipient, by date sent, and so on.

Electronic messages are heavily used to propose actions, initiate projects, make travel arrangements, invoice for services and products, and the like, and as such are more often than not associated with a future date and time. For example an invoice will have a due date; a confirmation for an airline reservation will be for a particular flight on a particular day and time. Email formats and other electronic messaging systems, however, do not provide a specific field for the future action or event time associated with an email, like they do for the "sent" date and time. Users of electronic messaging formats, such as emails, therefore must use another (typically also electronic) system to keep schedules and "to-do" lists, and may often be encumbered by a need to transfer information in an email or other electronic message into the schedule or "to do" list. For example, personal and business meetings are quite often arranged by emails, and the persons agreeing on a date and time to meet may have to transfer the agreed-to date and time into a person schedule program.

It is precisely this cumbersome process of schedule arrangement that is considerably alleviated by embodiments of the present invention described in enabling detail below.

SUMMARY OF THE INVENTION

In a preferred embodiment of the present invention a computerized message transaction system is provided, comprising an incubation function and a storage repository. In the system a transaction or a version of the transaction may be stored for a pre-specified period of time, and may be revived at the end of the specified time. In some embodiments the act of revival comprises an alert provided to a user of the system. Also in some embodiments the transaction or version of the transaction is retrieved from the repository and displayed at the time of revival. In still other embodiments, in storage, transactions are represented in boxes, including an Inbox for incoming transactions, and upon revival an incubated transaction or version of the transaction is moved to the Inbox. In some embodiments the transaction system manages one or more of emails, instant messages (IM), short message system (SMS) messages, facsimile transactions (faxes), Voice Over IP (VoIP) messages, or Plain Old Telephone (POTS) messages. Further the alert my be one or both of an audio or a visual alert.

In some embodiments of the system an input mechanism is provided at the time of incubation for a user to enter a reformulated version of the transaction, and if such a reformulated version is entered, the reformulated version may be stored with or instead of the original transaction. There may be functionality for integration with a scheduling application, wherein upon revival the reformulated version may be exported to the scheduling application as a scheduled entity.

In some embodiments transactions are stored in categories including one or more of type of transaction, conversation, To or From addresses, or subject matter. Also in some embodiments interactive windows are provided to a user with selections to initiate incubation for a transaction, and to set the incubation time period. In still other embodiments the time period may be set as a specific period of time, or by entering a point in time when the transaction is to be revived. In yet other embodiments the transaction or version of the transaction has a message body, and the message body is displayed as or along with the alert.

In another aspect of the invention a method for alerting a user of a message transaction system to a future need is provided, comprising the steps of (a) accessing an incubation function in the transaction system for a specific transaction or a version of the transaction; (b) setting an incubation time period through the incubation function; (c) storing the transaction or version of the transaction, or both; and (d) reviving the transaction of version of the transaction at the end of the incubation time period.

In some embodiments of the method, in the act of revival in step (d), an alert is provided to a user. Also in some embodiments the transaction or version of the transaction is retrieved from the repository and displayed at the time of revival. In still other embodiments, in storage, transactions are represented in boxes, including an Inbox for incoming transactions, and upon revival an incubated transaction or version of the transaction is moved to the Inbox. In yet other embodiments the transaction system manages one or more of emails, instant messages (IM), short message system (SMS) messages, facsimile transactions (faxes), Voice Over IP (VoIP) messages, or Plain Old Telephone (POTS) messages. In some cases the alert is one or both of an audio or a visual alert. There may further be a step for a user to enter a reformulated version of the transaction and if such a reformulated version is entered storing the reformulated version in step (c) with or instead of the original transaction.

In some embodiments of the method there may be a further step for exporting the reformulated version at the time of revival to a scheduling application as a scheduled entity. Also in some embodiments transactions are stored in categories including one or more of type of transaction, conversation, To or From addresses, or subject matter. In still other embodiments interactive windows are provided to a user with selections to initiate incubation for a transaction, and to set the incubation time period. The time period may be set as a specific period of time, or by entering a point in time when the transaction is to be revived. Further, the transaction may have a message body, and the message body may be displayed as or along with the alert.

In another aspect of the invention a computerized system for placing and managing a telephone call is provided, comprising an interactive preparation window wherein a user may enter call identifying information prior to making the call and a storage repository for storing a version of the call. The interactive preparation window allows entering third party recipients for a call in addition to the call destination, and the recorded call or a version of the call is sent as a message transaction to the third party recipients after the call is initiated. In some embodiments the system includes incubation functionality selectable through the preparation window, wherein a version of a call identified through the preparation window may be stored for a pre-specified time period, and revived at the end of the time period. In some embodiments the version of the call stored is one of an audio recording of the call or a text version of the call prepared from the audio. Also in some embodiments, upon revival an alert is provided to a user of the system. The alert may be one or both of an audio or a visual alert. At the time of the alert the recorded version of the call may be retrieved and presented to the user.

DETAILED DESCRIPTION OF THE INVENTION

Figure 1:
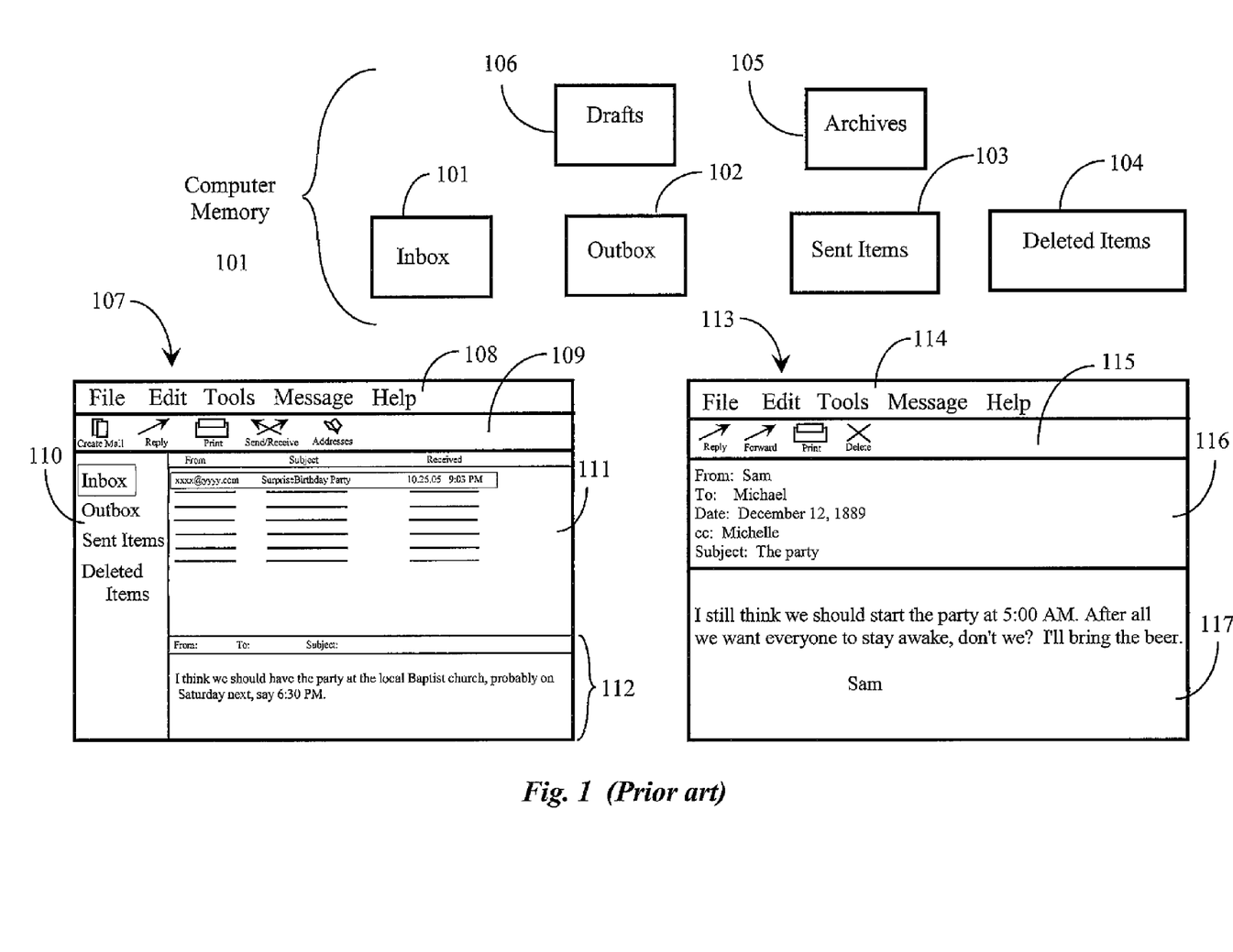
FIG. 1 is a diagram representing functionality of an electronic messaging system in the art at the time of the present invention.

FIG. 1 is a diagram representing functionality of an electronic messaging system in the art at the time of the present invention. In this particular example an email system is described. Such a system is made to function in analogy to a conventional postal system, which makes much of the display and functionality more intuitive for users. In such a system interactive displays are provided by the client (software) that allows a user to create new messages, to send the messages, to receive messages from others, to store and retrieve the messages, and to accomplish other functions as well.

Because the medium for transmission is a network, the well-known public Internet being a prime example, the addresses for senders and recipients are not home and business addresses as in a postal system, but names associated with electronic destinations, which in a network are typically computerized, network-connected servers. The server destinations are given domain names, but the addresses are in reality numeric codes associated with the domains and typically transparent to the users. All of these facts are well-known to those with skill in the art.

An email client provides, for example, on a user's computer a format such as window 113 shown in FIG. 1, for displaying a message. Typically such a message display has a menu line 114 with drop-down menus for access to command functions by the user, a command line 115 with icons also initiating functions, such as "Reply", "Forward", "Print" and the like. There is also typically a summary area 116 which shows a "from" address for the sender of the message, a "to" address for the intended recipient, A date (and often a time) that the message was sent, a cc line for addresses to whom copies may have been sent, and a subject line. Finally the body of the message is displayed in an area 117.

Although not shown in FIG. 1, when a user selects to create a message or forward an existing message, an interactive window similar to window 113 is provided by the client with fields for "To:" "cc:" and "Subject", and ability to type a message into the message body area. When a user creates a message in an email client, typically upon initiating a "send" function the client stores the message in an Outbox, shown as a box 102 in FIG. 1. Then when the user selects another "send" function, the client transmits everything in the outbox. These functions can be done differently, such as for example, transmitting a message when the user selects the first "send".

When messages are received, these messages are typically placed by the client in an "inbox", illustrated by box 101. An interactive window 107 is typically provided by an email client to show the contents of a box in associated storage. In exemplary window 107 there is a menu line 108 much the same as menu line 114 in window 113, a command line 109 similar to command line 115, a "category selection" region 110 with selectable labels for different boxes, a listing region 111 for showing the contents of a box as a list, and a message body region 112 for showing the message body of a selected message.

In the example shown the Inbox is selected and the listing area shows items in the inbox. These are typically newly-received messages. The message at the top of the list in region 11 is selected, so the message body area 112 shows the body of that message.

When a message is created then sent, a copy of the message is stored in box 103 labeled "Sent Items". When a message is deleted from the In Box, a copy of that message is stored in Deleted Items box 104. This functionality allows a user to review his or her messages sent and/or deleted. There is also in this example a box 106 for storing drafts, which may be retrieved, edited and sent later, and an archives box 105 for archival storage and retrieval.

The description of an email system as an example of a messaging system, aided by the diagram of FIG. 1, is not meant to be a complete description of any actual or commercial messaging system, but merely exemplary of such systems in general. The skilled artisan will understand that there are many other functions and variables in such systems. Further, the analogy to actual boxes for storage is exemplary and fictional as well, because in reality the messages are electronic, and are stored typically in a local computer memory much the same as any other sort of digital information. There are, of course, no real boxes.

In the prior art example described above with the aid of the diagram of FIG. 1, there are additional functions that may be imposed. Emails may be stored, for example, in subject, or conversation groups. This is a function of a well-known commercial system known as G-Mail. There may be, for example, a number of emails, even a large number, all associated with a particular topic. In setting up a birthday party, for example, there may be a number of people sending and receiving messages until a time and date is agreed upon, and particular responsibilities are acknowledged for making the party happen. All such messages may be stored in a sub-category associated with that party. There are similarly many other ways that messages may be categorized, stored and retrieved.

Clearly having storage providing perusal, search and the like is very valuable for users to accomplish desirable ends, but it is still true that to use the information in stored messages, one has to access the stored messages, find the right information, and then use the information in a fashion that helps accomplish the desired object. In the present case we are concerned primarily with action or event time-associated information. As a very simple example, suppose a supervisor in a service organization communicates with her subordinates on a local network using a messaging system that has some or all of the features described above as common in the art. She may well assign tasks to these folks and a date and time required for completion of each task. She will, of course, want to revisit each assignment at or near the time of supposed completion to be sure the task gets done, and clear her folks for reassignment to new tasks. To do so, she needs to make a note or record of each task she assigns and its scheduled completion date, and to whom the task is assigned, and keep that dynamic listing at hand for reference on a regular basis. This is a bit cumbersome.

Figure 2:
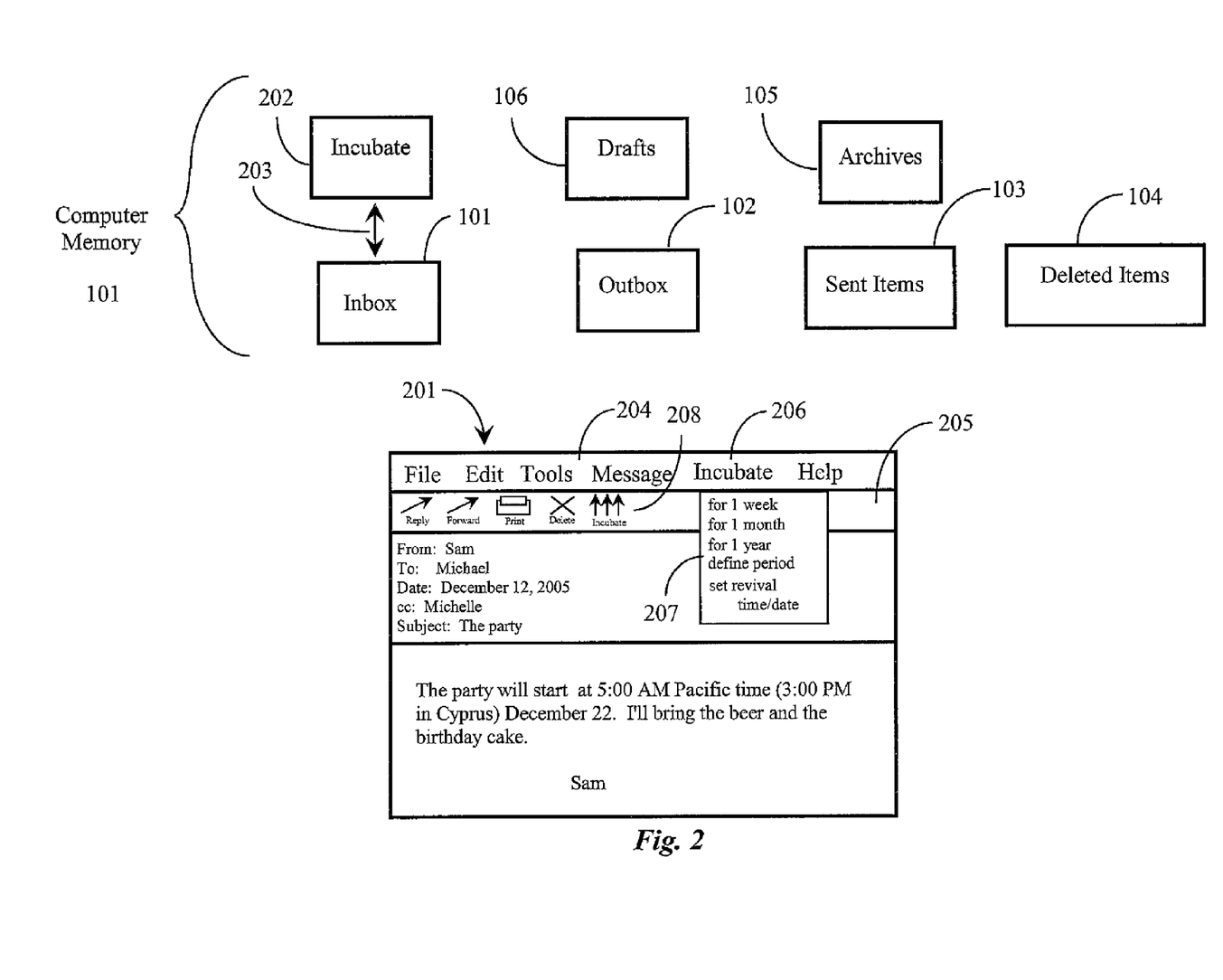
FIG. 2 is a diagram showing a window 201 illustrating a received message and storage categories depicted as boxes in a messaging system according to an embodiment of the present invention.

FIG. 2 is a diagram showing a window 201 illustrating a received message and storage categories depicted as boxes in a messaging system according to an embodiment of the present invention. Received message 201 has a menu line 204 with a new and unique function 206 termed Incubate by the inventor. When a user receives a message he/she may select Incubate in the menu line, revealing a drop-down menu 207 with several selections for setting a period for incubation. Considering the message body indicating the party will be on December 22, and the Date: of the current message as Dec. 12, 2005, the user may well wish to incubate the message for one week. The user would do this in this example by selecting "for 1 week" in the drop-down menu under Incubate. One week from the message date will be December 19, a good time to be reminded of a party to take place on December 22.

The incubate function causes the current message 201 to be stored in a special category indicated by Incubate box 202, and to be marked for revival. Since the period selected in this example is one week, the message will revive after one week, which is December 19. Revival in this embodiment comprises the message moving from the revival box to the Inbox 101 on December 19. So the message disappears, but reappears in the inbox on December 19, as a reminder for the party to take place at 3:00 PM three days later.

One selection shown in the drop-down menu is "set revival date/time". If the user selects this option a window appears (not shown) allowing the user to enter a date and optionally a time as well in an input field. The message will then move into the Inbox at that date and time.

In alternative embodiments there are other choices that may be provided for a user to set incubation. For example, a user may want to set an escalating alert for the event, so an alert appears three days in advance, one day in advance, on the day of the party in the AM, and then each hour on the hour until one hour before the party. This may seem overkill, but is presented just as an example of the flexibility that may be provided.

The message window in this embodiment also has a command line 205 with icons for initiation of functions, and the Incubate function may be initiated by icon 208 as well. In this instance the incubation choices may be the same as those provided in the drop-down menu, or they might be different.

Figure 3:
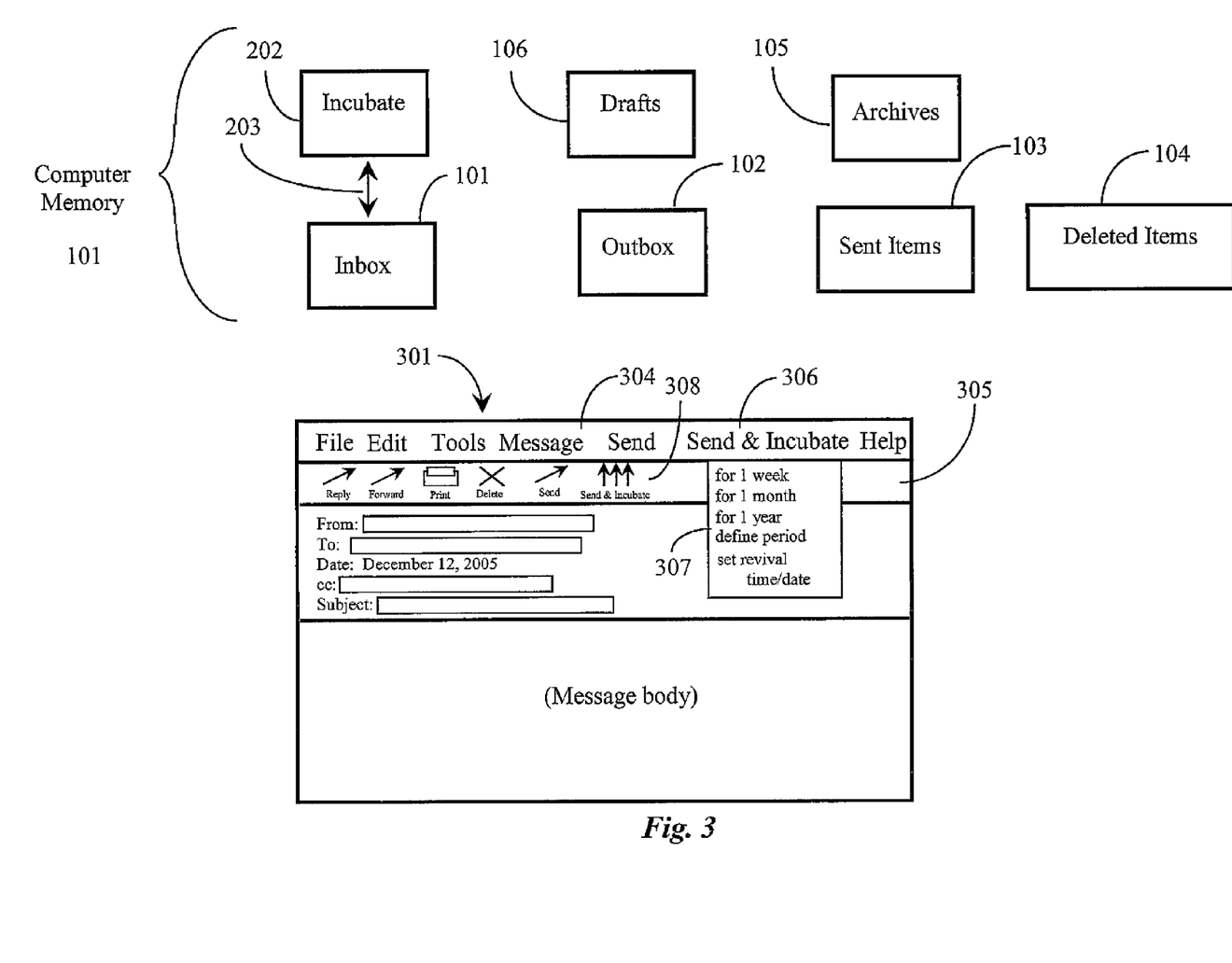
FIG. 3 is a diagram showing a window 301 illustrating a message to be sent and storage categories depicted as boxes in a messaging system according to an embodiment of the present invention.

FIG. 3 is a diagram showing a window 301 illustrating a message to be sent and storage categories depicted as boxes in a messaging system according to an embodiment of the present invention. In window 301, as is well-known in many messaging systems, there are input fields for a user to input a From address (which may be filled in automatically for a specific user), a To: address for a destination for the message, one or more copies to other recipients, and a subject line. There is similarly a Message Body section where a user may enter a message. Although not shown, there are also functions in some embodiments for a user to make attachments of almost any sort of electronic file, such as other emails, image files, audio files and the like. This is all well-known in the art.

Unique in this embodiment is a function "Send & Incubate" which may be initiated at menu item 306, bringing a drop-down menu 307. After a message is prepared and addressed (ready to go) the user may select either Send (for a regular message with no future action or event association), or Send & Incubate to both send the message and incubate the message as well. Send and Incubate causes a copy of the message to be sent to the intended recipient, a copy to be stored in the Sent Items box 103, and a copy to be stored in the Incubate box 202, tagged for revival. The drop-down menu for Send and Incubate may have the same selectable items as that for the Incubate menu described above, and escalating and repetitive alert functions may be set as well in some embodiments.

The Send & Incubate function provided in this embodiment to be available when a message is created is useful and applicable for managers and the like, as described above, to assign tasks and responsibilities, and to have the assignments reappear in the inbox at or near the time that a task is scheduled for completion. It will be apparent to the skilled artisan that there are many other uses in other circumstances as well.

In both the Incubate and the Send & Incubate functions the Incubate portion is essentially the same. That is a copy of the transaction is stored in the Incubate box tagged with information as to when it is to be revived and should appear again in the Inbox. And it is reminded here that the inventor is well aware of the operations and machinations of digital manipulation in computer systems, and that the "boxes" analogy is just that, an analogy to make the operations more intuitive and easier for the user interface.

In some embodiments of the present invention, when one of the Incubate functions is initiated, or before, functions are provided for the user to attach notes or files to the transaction to be incubated. In one embodiment an interactive window may be provided or automatically initiated which provides for entry of a note or attachment of one or more files. When an incubated transaction reappears there may be a field for prominently displaying the attached note. An audio alert may also be set to sound at the moment of reappearance to alert the user that there is a note to be read or an attachment to consider. As an example, a manager assigning tasks might summarize the assignment for his/her own purposes in a different way than the language in the message to the subordinate assigning the task.

In the above descriptions email systems are relied upon to describe the nature of the unique incubation functions, but other messaging systems will benefit as well from the invention, such as voice mail systems, Short Message Systems (SMS), Instant Messaging (IM) systems, facsimile messaging, and even personal meetings, wherein decisions and future actions or events agreed upon may be entered in an incubation system for later revival. SMS and IM may be configured to operate much like an email system, because there exist at the time of this filing specific protocols for such systems and specific interactive computer interfaces. AOL™ IM is a case in point. Incubate and Send & Incubate functionality may be added to such systems as new interactive buttons or selectable menu elements much as shown above for email. In voice over Internet Protocol (VoIP) systems the telephony functions are highly digitized and computer integrated. Most such systems commercially available already have facility for storing conversations (single calls, we all them transactions). Functionality may be added to such systems as well to incubate transactions.

As an example of Incubate functionality in a peer-to-peer IP telephony system, consider added functionality at a user's computerized, telephony-capable appliance to store and incubate a call about to be made. A manager uses the system to call a subordinate and assign a task. At the user's initiation (or automatically) a selection may appear to Incubate the next call to be made, with an input field for the user to select the incubation period, or to set a specific date or date and time for revival of the incubated call. Then the user dials (or otherwise addresses) the call. The incubation is impervious as to whether the intended recipient answers. After the user enters the incubation information, the user initiates the call. The storage/incubation system categorizes the call at least in part by the dialed number or address, adding this call to a string of calls between the manager and the subordinate, and records the conversation if the recipient answers, or the message recorded on the other end if a voice mail system answers, with the audio file tagged for revival according to the Incubation function.

At the time of revival the user may get an audio alert, a visual alert, or both, with a selection to play the revived transaction. There may be also functionality, as described above for other messaging systems, for attaching an audio file or other sort of file to the stored transaction to be revived.

The same kind of functionality described thus far may be applied to conventional telephony, termed POTS in the art for Plain Old Telephone System. Telephone systems have become more and more computerized and in particular switching and routing equipment is highly computerized. Software may reside in any one of many computerized regions in an overall system for providing the functionality for incubating a reviving telephone conversations.

In the case of personal meetings, as long as there is facility for recording the actual or even normalized or summarized versions of meetings, which we will also call transactions, the opportunity exists for storing versions of anything that happens that has a future action or event component, incubating that entity, and reviving the incubated entity at an appropriate time.

Facsimile systems send messages in a digital way over telephone systems, both POTS and IP, and are recordable. In a facsimile system there may be added computerized functions for recording, incubating and reviving very similar to the functionality described above.

Keeping in mind that all of the message transaction systems available to users are computerized wholly or in part, or can be digitized (like in the case of personal conversations, which may be recorded and stored in a digital data repository, in one embodiment of the present invention a comprehensive system is provided, usable on, for example a PC, that provides storage, grouping, stringing, and incubation and revival functions encompassing a plurality of transaction messaging systems. In this embodiment a user may have a personal computer with IP telephony capability, computerized facsimile capability, Instant Messaging capability, and perhaps other message transaction capability as well.

In this particular embodiment an interactive interface is provided, in this case modeled after the familiar interfaces for email systems, wherein the underlying system may interact with any one of the available transaction messaging systems in any one instance, and aggregate and normalize transactions over all of the systems.

Figure 4:
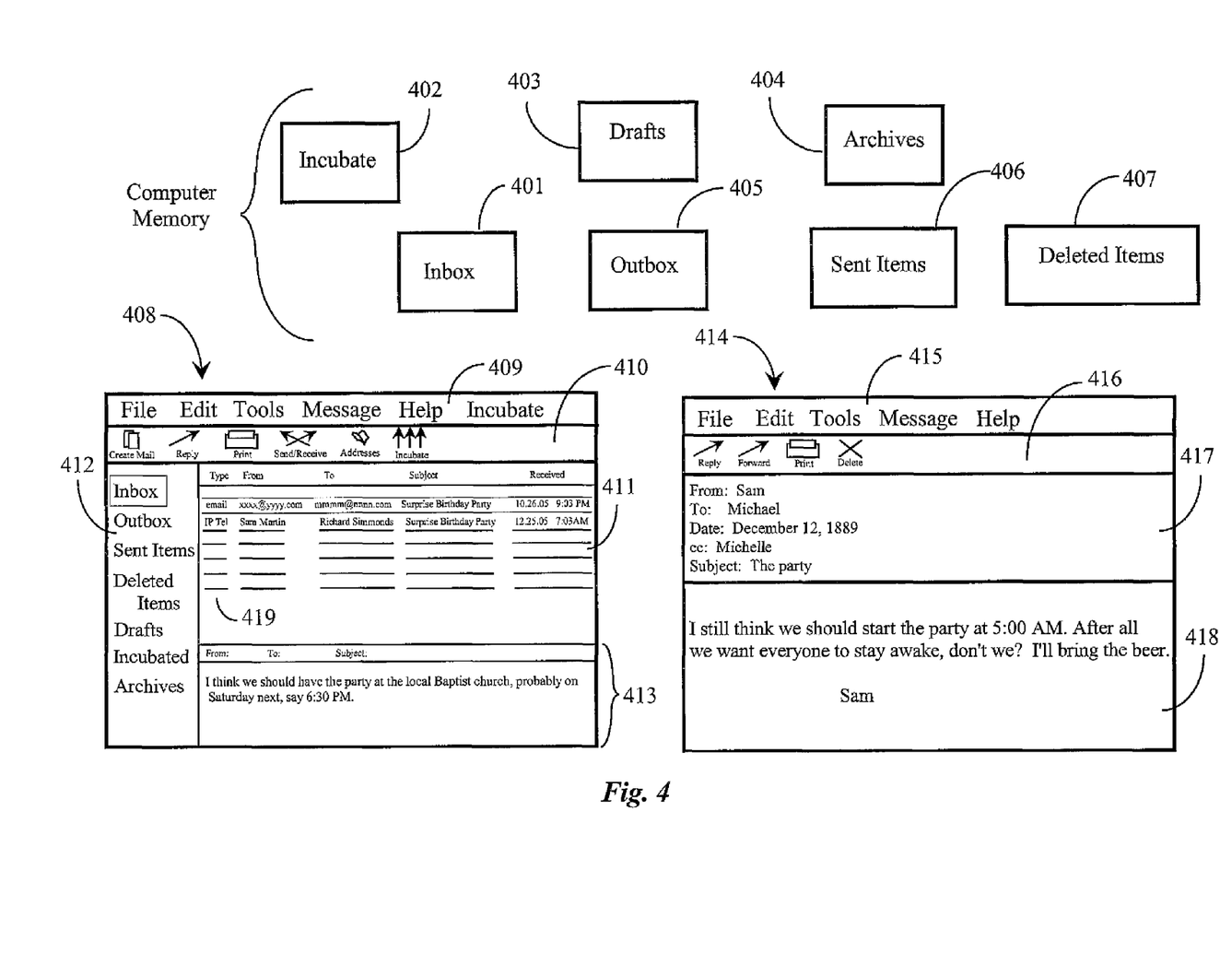
FIG. 4 is a diagram partly illustrating an integrated Incubating transaction system according to this unique embodiment of the invention.

FIG. 4 is a diagram partly illustrating an integrated Incubating transaction system according to this unique embodiment of the invention. The system in this embodiment analogizes to boxes, as described above for email systems, so there is a box 401 for incoming transactions, a box 402 for incubated transactions, a box 403 for drafts (where drafts may be appropriate, such as emails and faxes), a box 404 for archived transactions, an outbox 405 for transactions pending transmission, a box 406 for copies of transactions transmitted, and a box 407 for deleted transactions.

In this embodiment a window 408 is presented to list contents of a box selected in sidebar 412, and in this example the Inbox is selected. There is a menu bar 409 as before, and a command bar 410 as before. Note that in both the menu bar and the command bar access to the incubate function has been added to this listing window. This provides ability for a user to incubate a transaction from any box, rather than just from the Inbox or as Send & Incubate when making up a new transaction. This may also be done in other embodiments dedicated to specific transaction types, such as emails or IP telephony as described above.

In listing region 411 in this embodiment a column 419 lists a type for the transaction listed. Two transactions are specifically listed in this example, one being an email, and the other an IP telephony transaction. The system in this embodiment is not limited to these two types, however, and other types may be managed and listed, such a faxes, IM messages, and the like as discussed above.

As mentioned, the Inbox is selected, and the first transaction listed in the Inbox, which is an email, is selected. Window 414 illustrates the email message selected, providing all available information in region 417, and the text of the body of the message in region 418. In this embodiment the nature of window 414 changes somewhat depending on the type of the transaction. For example, if the second-listed transaction, the IP telephony transaction, is selected, window 414 might have the menu and command lines as shown and an information region 417, but the information might be somewhat different. The IP addresses might be added in the information, and instead of text in region 418 there may be an icon as a link to the stored audio file, which may be played by clicking on the icon. In some embodiments there may be a voice-to-text function so the message my be stored as text from the audio, and then displayed as text. A window for POTS telephony may be similar. But the window would not change substantially in most cases for differing types of message transactions.

In some embodiments messages are stored in conversation groupings, as described above and currently done in some known systems, and if this is done, grouping and conversation topic and the like may be indicated as well.

Figure 5:
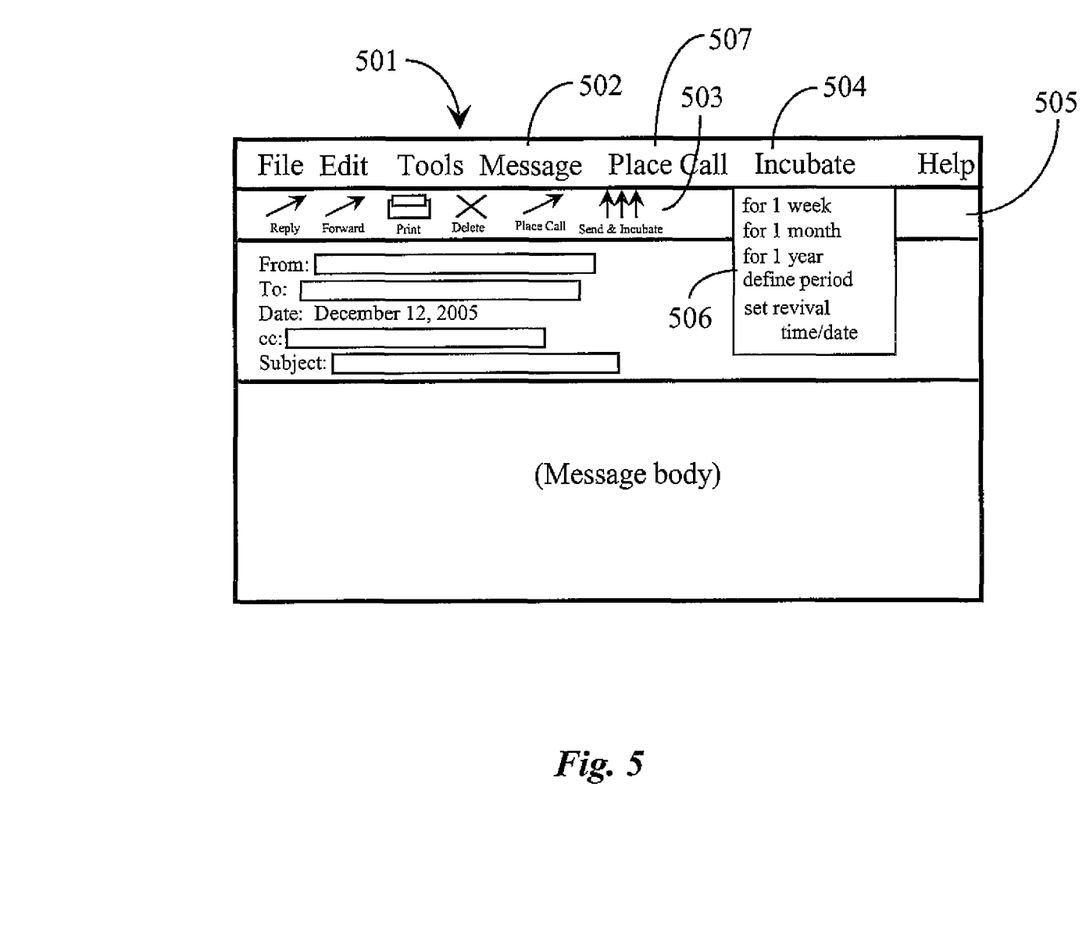
FIG. 5 illustrates an interactive window for making an IP telephony transaction in an embodiment of the present invention.

FIG. 5 is a diagram illustrating further functionality of the system partially described above with reference to FIG. 4. FIG. 5 illustrates an interactive window 502 for making an IP telephony transaction in an embodiment of the present invention. This window is accessed and used if the user wishes to record and save the transaction, whether or not incubation might be used, but need not be used to place all IP calls.

In window 501 there is a menu bar 502 and a command line 503, as before. The Send function is now a Place Call function. Immediately prior to making an IP telephony call the user invokes this window, enters to whom the call is to be placed, which may be with aliases as with emails, the From: and the date and time may be automatically entered, copies to others (cc:) may be indicated, which is in itself a new and unique function, and a conversation group or subject may be entered. The user may also select to incubate the call, and the selections may be any of those illustrated or described above.

Once the preparation steps are complete the user may select Place Call, and the call will be placed through whatever IP telephony capability is integrated with the system and the user's computer. In some embodiments the system will record the call made, whether it is a conversation between the user and a recipient, or a message left on a voice recording system. In some embodiments a voice-to-text capability is called to convert the audio to machine-readable text while the call takes place, and the text is stored in the Sent or the Incubate box (depending on selections), and in some embodiments both forms may be saved.

At the appropriate time for those messages incubated, the transaction revives, and the user is alerted, such as through the inbox as described above. If a transaction to go is a fax message, an IM or some other transaction type, the prep box 501 is appropriate to the message and the functionality is specific to the transaction type.

In some embodiments of the invention, in which incubated transactions are tagged and stored, functionality is provided for retrieving and sorting incubated transactions by one of several criteria. For example, transactions may be sorted by date and time, by conversation, by specific time windows and the like. And displays may be provided in a variety of ways. In some cases sorting function initiation and configuration buttons are provided in a listing window like those described with reference to FIGS. 1 and 4.

The integrated system described above is described as resident on a user's computer. In alternative embodiments such a system, or a system dedicated to one or a specific number of transaction types may be implemented as a client-server system, and may be network server-based, such that a client may become a subscriber for a period of time and use the functionality described from a host's server system over a network such as the Internet network.

In some embodiments functionality may be provided for altering a transaction type, so that an email sent to an intended recipient may be delivered as a voice message if the recipient's email is not active, or for any other reason. The system may be compatible with fax to email systems, and the like. Further, functionality may be provided into existing commercial systems in some embodiments through "plug-ins" that may be installed to enhance the functionality of the existing system. Incubation functions may be added to any existing email system, for example, through plug ins.

Reappearing in an Inbox is just one of a variety of actions that may be associated with revival of incubated messages in various embodiments of the invention. The Inbox is a good choice, because persons using email, for example, typically visit their Inbox several times a day. Some may prefer a different presentation for revived, incubated messages, however, and in some embodiments of the invention mechanisms are provided for the user to select a different box for revived messages, and in some embodiments a new box reserved for revived messages may be created.

An important function of the incubation and revival is in scheduling, as is described elsewhere in this specification. Accordingly, in some embodiments of the invention incubation functionality in message systems may be integrated with scheduling software functions, several of which are commercially available and known to the skilled artisan. It was described above that in some cases in embodiments of the invention facility is provided for a user to add a note or file attachment to a message to be incubated. Also in some embodiments functionality may be provided for a user to select for the incubated message to appear in a schedule upon revival. In such an instance the user might reformulate the gist of the incoming message into a schedule entity, and attach that to the message, such that on revival the reformulated message will by imported directly into a scheduling application, in a manner to appear in that application as a scheduled item. In some more sophisticated cases functionality might be provided to automatically parse messages to be incubated to create a suitable schedule entity to export to a schedule application.

In some embodiments of the present invention configuration functions, and personal profile and preference functionality is provided as well allowing the user to customize the incubating message system to his/her preferences and style.

It will be apparent to the skilled artisan that the embodiments and variations described herein may be altered, in some cases substantially, without departing from the spirit and scope of the invention. There may be other message transaction types for example not described or discussed in this specification that will benefit by the unique Incubation functionality described herein. Such systems are within the scope of this disclosure. Further, the descriptions above have been focused largely on computerized systems with a display, such as desktop and laptop computer systems. The unique functionality described, however, may be implemented on or in many other sorts of computerized appliances, such as cellular telephones, personal digital assistants (PDAs), high-end paging systems and the like. There also may be many ways that functionality described may be combined in various embodiments. These combinations are within the scope of the specification. It will be clear that many other changes may be made within the spirit and scope of the invention. For these and other reasons the invention shall be accorded the breadth of the claims that follow.

What is claimed is:

1. A computerized system for placing and managing a telephone call, comprising:
   an interactive preparation window enabled for a user to enter identifying information prior to making the telephone call, including at least one intended recipient for the telephone call and one or more third parties who are not intended recipients for the telephone call;
   a storage repository enabled for recording and storing a version of the telephone call as a voice recording, text derived from the voice recording, or both; and a Place Call function;

wherein, once the intended recipient and the one or more third parties are entered, the user selects the Place Call function, which causes the call to be placed to the intended recipient, the telephone call is recorded, creating the stored version of the telephone call, and the stored version of the telephone call is sent as a message transaction to the third parties.

2. The system of claim 1 wherein the system includes incubation functionality selectable through the preparation window, wherein a version of a call identified through the preparation window may be stored for a pre-specified time period, and revived at the end of the time period.

3. The system of claim 2 wherein upon revival an alert is provided to a user of the system.

4. The system of claim 3 wherein the alert is one or both of an audio or a visual alert.

5. The system of claim 3 wherein, at the time of the alert, the recorded version of the call is retrieved and presented to the user.

* * * * *